US011685552B2

United States Patent
Truess et al.

(10) Patent No.: US 11,685,552 B2
(45) Date of Patent: Jun. 27, 2023

(54) FRACTIONAL PULSE ASSEMBLY LINE

(71) Applicant: The Boeing Company, Chicago, IL (US)

(72) Inventors: Jeffrey Alan Truess, Mukilteo, WA (US); Richard Calawa, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/524,072

(22) Filed: Nov. 11, 2021

(65) Prior Publication Data

US 2022/0177161 A1 Jun. 9, 2022

Related U.S. Application Data

(60) Provisional application No. 63/123,324, filed on Dec. 9, 2020.

(51) Int. Cl.
*B64F 5/10* (2017.01)
*B64F 5/50* (2017.01)
*B64C 1/06* (2006.01)

(52) U.S. Cl.
CPC ............... *B64F 5/10* (2017.01); *B64F 5/50* (2017.01); *B23P 2700/01* (2013.01); *B64C 1/069* (2013.01)

(58) Field of Classification Search
CPC .......... B64F 5/10; B64F 5/50; B23P 2700/01; B64C 1/069
See application file for complete search history.

(56) References Cited

U.S. PATENT DOCUMENTS

| 6,121,781 A * | 9/2000 | Martinez ............... B25B 11/005 324/661 |
| 7,178,660 B2 * | 2/2007 | Dehne .................... B62D 65/18 104/287 |
| 7,527,222 B2 * | 5/2009 | Biornstad ............... B29C 70/44 244/119 |

(Continued)

FOREIGN PATENT DOCUMENTS

| CN | 102616095 A | 8/2012 |
| DE | 10134852 A1 | 8/2002 |

OTHER PUBLICATIONS

Conveyor and Transfer Systems; Mahindra Tsubaki Conveyor Ststems Pvt. Ltd.; Sep. 23, 2020.

(Continued)

*Primary Examiner* — Michael W Hotchkiss
(74) *Attorney, Agent, or Firm* — Duft & Bornsen, PC

(57) ABSTRACT

Systems and methods are provided for advancing a fuselage section of an aircraft. One embodiment is a system that includes a series of plates configured to be sequentially affixed along a length of the fuselage section, and a track configured to form a frictional fit with the plates. The track includes drive units configured to form nips retaining the series of plates, and that are configured to advance the fuselage section along the track in a process direction, and indexing elements that are configured to engage with indexing elements at the plates during pauses between operation of the drive units. The system also includes tools configured to perform work on the fuselage section while the indexing elements of the track are engaged.

20 Claims, 11 Drawing Sheets

(56) References Cited

U.S. PATENT DOCUMENTS

| | | | | |
|---|---|---|---|---|
| 8,157,212 | B2* | 4/2012 | Biornstad | B29C 53/587 244/119 |
| 8,539,658 | B2* | 9/2013 | Munk | B64F 5/10 29/281.1 |
| 8,661,684 | B1* | 3/2014 | Boyd | B21D 53/92 29/897.2 |
| 8,761,989 | B1* | 6/2014 | Murphy | G05D 1/00 701/25 |
| 9,610,738 | B2* | 4/2017 | Gallant | B64F 5/50 |
| 9,688,478 | B2* | 6/2017 | Robbin | B05B 13/0221 |
| 9,943,937 | B2* | 4/2018 | Sisco | B21J 15/142 |
| 10,427,254 | B2* | 10/2019 | Day | B23B 41/00 |
| 11,117,184 | B2* | 9/2021 | Hirai | B21J 15/42 |
| 11,180,264 | B2* | 11/2021 | Best | G01M 17/007 |
| 11,260,993 | B2* | 3/2022 | Kasahara | B23P 21/00 |
| 11,267,585 | B2* | 3/2022 | Datas | B21J 15/142 |
| 11,273,896 | B2* | 3/2022 | Hirai | B64C 1/12 |
| 2006/0108470 | A1* | 5/2006 | McCrary | B64F 5/50 244/50 |
| 2006/0118235 | A1* | 6/2006 | Lum | B25B 5/14 156/285 |
| 2007/0036627 | A1* | 2/2007 | Wright | B25H 1/0007 410/49 |
| 2013/0158697 | A1* | 6/2013 | Stone | B64F 5/50 29/897 |
| 2015/0266147 | A1* | 9/2015 | Reid | B64F 5/10 29/525.01 |
| 2016/0075450 | A1* | 3/2016 | Hunt | B64F 5/10 264/320 |
| 2016/0354883 | A1* | 12/2016 | Vogt | B23P 19/04 |
| 2019/0030588 | A1* | 1/2019 | Hirai | B64F 5/10 |
| 2019/0235479 | A1 | 8/2019 | Ikeda et al. | |
| 2021/0061489 | A1* | 3/2021 | Datas | B25J 9/02 |
| 2021/0229837 | A1* | 7/2021 | Brindeau | B64C 1/069 |
| 2022/0097870 | A1* | 3/2022 | Godard | B64F 5/10 |

OTHER PUBLICATIONS

Conveyor; Automotive Conveyors & Systems; http://cntralconveyor.com/automotive; Sep. 17, 2020.
Friction Conveyor System; Nakanishi Metal Works Co., Ltd.; www.nkc-j.co.jp/eng/yusoki/y; Sep. 17, 2020.
Friction Conveyor System—Overhead & Inverted; www.asi.com/friction-conveyors; Sep. 23, 2020.
Part Conveyor—Friction Drive; Electroimpact Propietary.
Steve Smith et al.; HAWDE Five Axis Wing Surface Drilling Machine; SAE International; 2004.
European Search Report; Application EP21197380; dated Mar. 11, 2022.
Maskow J et al.; XP54251A; Produktionsautomatisierung in der Flugzeugrumpfmontage; Jul. 31, 1989.

* cited by examiner

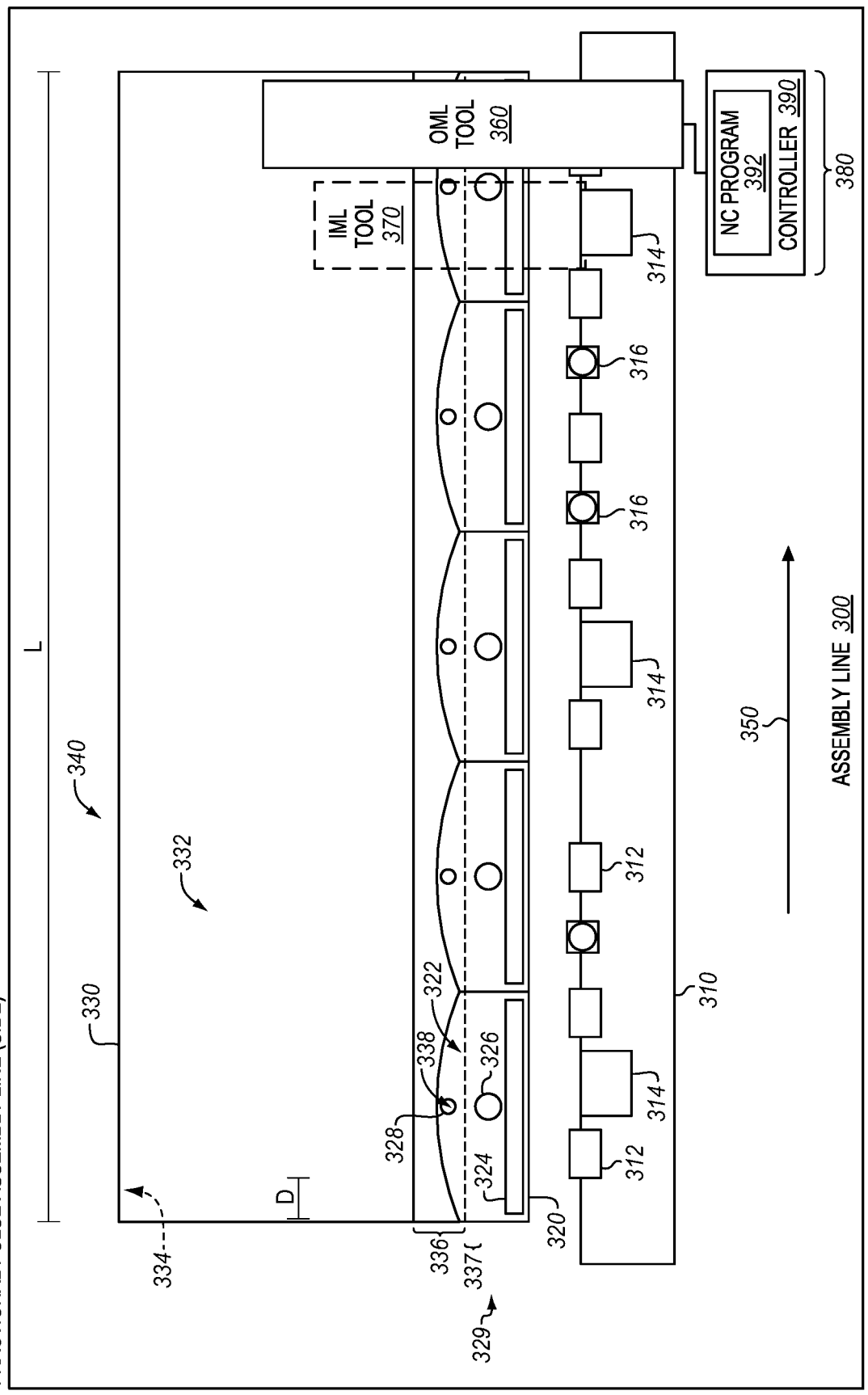

US 11,685,552 B2

FRACTIONAL PULSE ASSEMBLY LINE

RELATED APPLICATIONS

This non-provisional patent application claims priority to U.S. Provisional Patent Application No. 63/123,324, filed on Dec. 9, 2020.

FIELD

The disclosure relates to the field of aircraft, and in particular, to fabrication of aircraft.

BACKGROUND

In the aerospace industry, operations relating to transport and assembly of airframe components are performed in fixed cells. In each cell, a structure is scanned and/or indexed to the cell, and then tools, equipment, and/or workers are brought to that portion of the structure needing to be worked upon in that cell. This process of scanning and/or indexing occurs every time a new structure is brought to the cell. Furthermore, when a structure is moved to a next cell, it is again scanned and/or indexed to the cell and the necessary tools, equipment, and/or workers are brought to that portion of the structure needing to be worked upon in that cell.

Therefore, it would be desirable to have a method and apparatus that take into account at least some of the issues discussed above, as well as other possible issues.

SUMMARY

Embodiments described herein include assembly lines that pulse fuselage sections in a process direction to stations which perform work on the fuselage sections. The work may include installing frames, cutting out holes for windows or doors, etc. These arrangements provide a technical benefit over prior systems because they reduce amounts of space required for fabrication and assembly at a factory floor, increase throughput, and reduce downtime.

One embodiment is a system for advancing a fuselage section of an aircraft. The system includes a series of plates configured to be sequentially affixed along a length of the fuselage section, and a track configured to form a frictional fit with the plates. The track includes drive units configured to form nips retaining the series of plates, and that are configured to advance the fuselage section along the track in a process direction, and indexing elements that are configured to engage with indexing elements at the plates during pauses between operation of the drive units. The system also includes tools configured to perform work on the fuselage section while the indexing elements of the track are engaged.

A further embodiment is a method for transporting and performing work upon a fuselage section. The method includes affixing a series of plates sequentially along a length of a lower portion of the fuselage section, forming a frictional fit between the plates and a track, advancing the fuselage section along the track in a process direction by operating drive units at the track that contact the series of plates, pausing advancement of the fuselage section, engaging indexing elements of the track with indexing elements at the plates during the pause, and performing work on the fuselage section via tools at the track while the indexing elements of the track are engaged.

A further embodiment is a system for performing work on a fuselage section. The system includes work stations disposed along a track configured to perform work on the fuselage section, and drive units at the track configured to form a frictional fit with the section, and further configured to iteratively drive the section in a process direction, followed by pausing. The system also includes scanners configured to analyze markings at the fuselage section to determine a distance traveled by the fuselage section.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 3B is a further schematic diagram of a side view of an assembly line that fractionally pulses a fuselage section in an illustrative embodiment.

DESCRIPTION

The drawings and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The fuselage sections discussed herein are composite parts in many embodiments. Composite parts, such as Carbon Fiber Reinforced Polymer (CFRP) parts, are initially laid-up in multiple layers that together are referred to as a preform. Individual fibers within each layer of the preform may be aligned parallel with each other, but different layers exhibit different fiber orientations in order to increase the strength of the resulting composite part along different dimensions. Furthermore, some layers may comprise woven fabric made from fibers. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform to a final hardened shape (i.e., transitioning a preform into a composite part) is referred to as "hardening," and this term encompasses both the curing of thermoset preforms and the forming/solidifying of thermoplastic preforms into a final desired shape.

Figure 1:
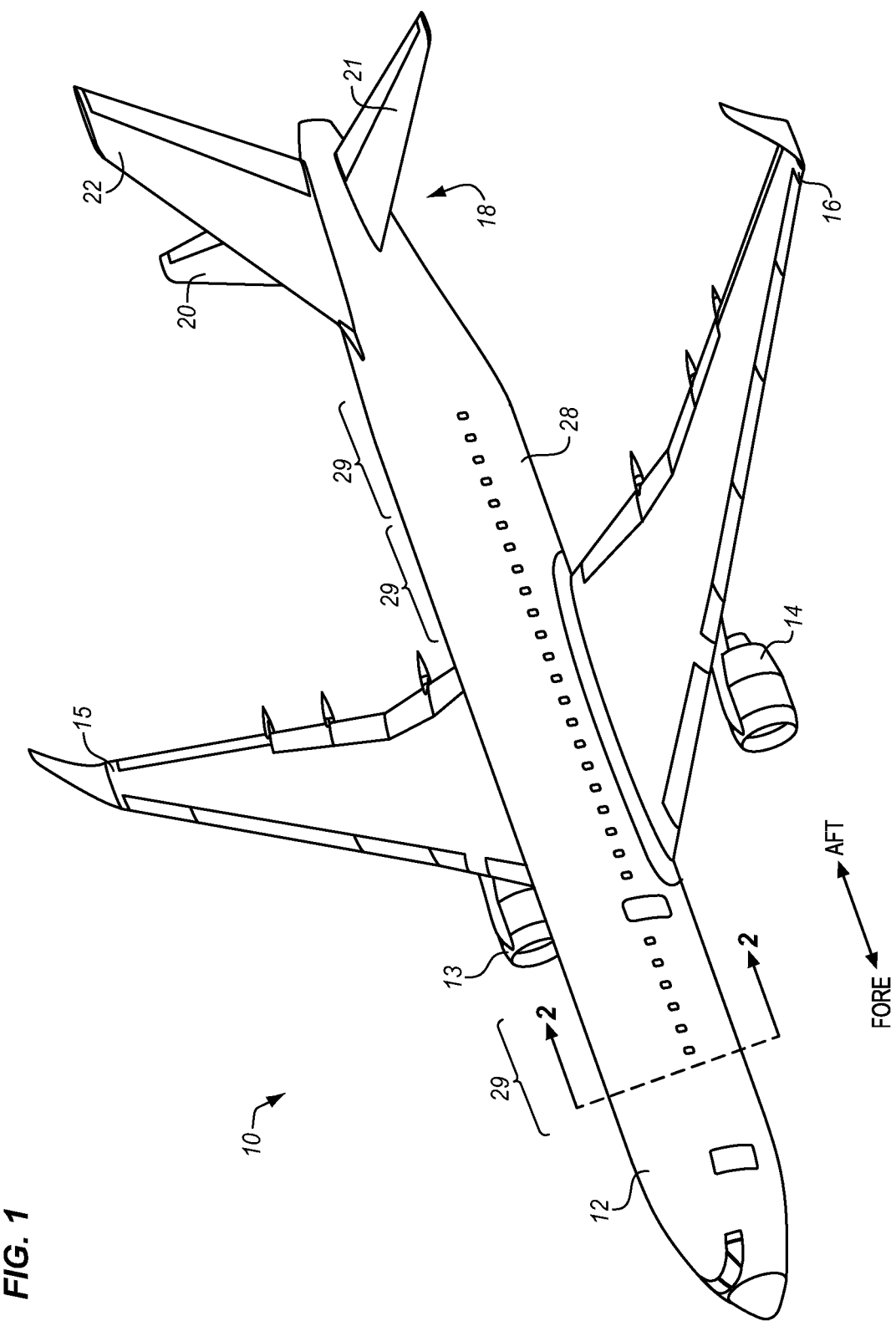
FIG. 1 illustrates an aircraft in an illustrative embodiment.

Turning now to FIG. 1, an illustration of an aircraft 10 is depicted for which the fabrication systems and methods described herein may be implemented. In this illustrative example, aircraft 10 includes wing 15 and wing 16 attached to fuselage 28 having a nose 12. Aircraft 10 includes engine 13 attached to wing 15 and engine 14 attached to wing 16. Tail section 18 is also attached to fuselage 28. Horizontal stabilizer 20, horizontal stabilizer 21, and vertical stabilizer 22 are attached to tail section 18 of fuselage 28. The fuselage 28 itself is formed from multiple barrel sections 29 which have been joined together. In this embodiment, three barrel sections 29 are labeled, but any suitable number of barrel sections 29 may be utilized to form the fuselage 28 as a matter of design choice.

Figure 2:
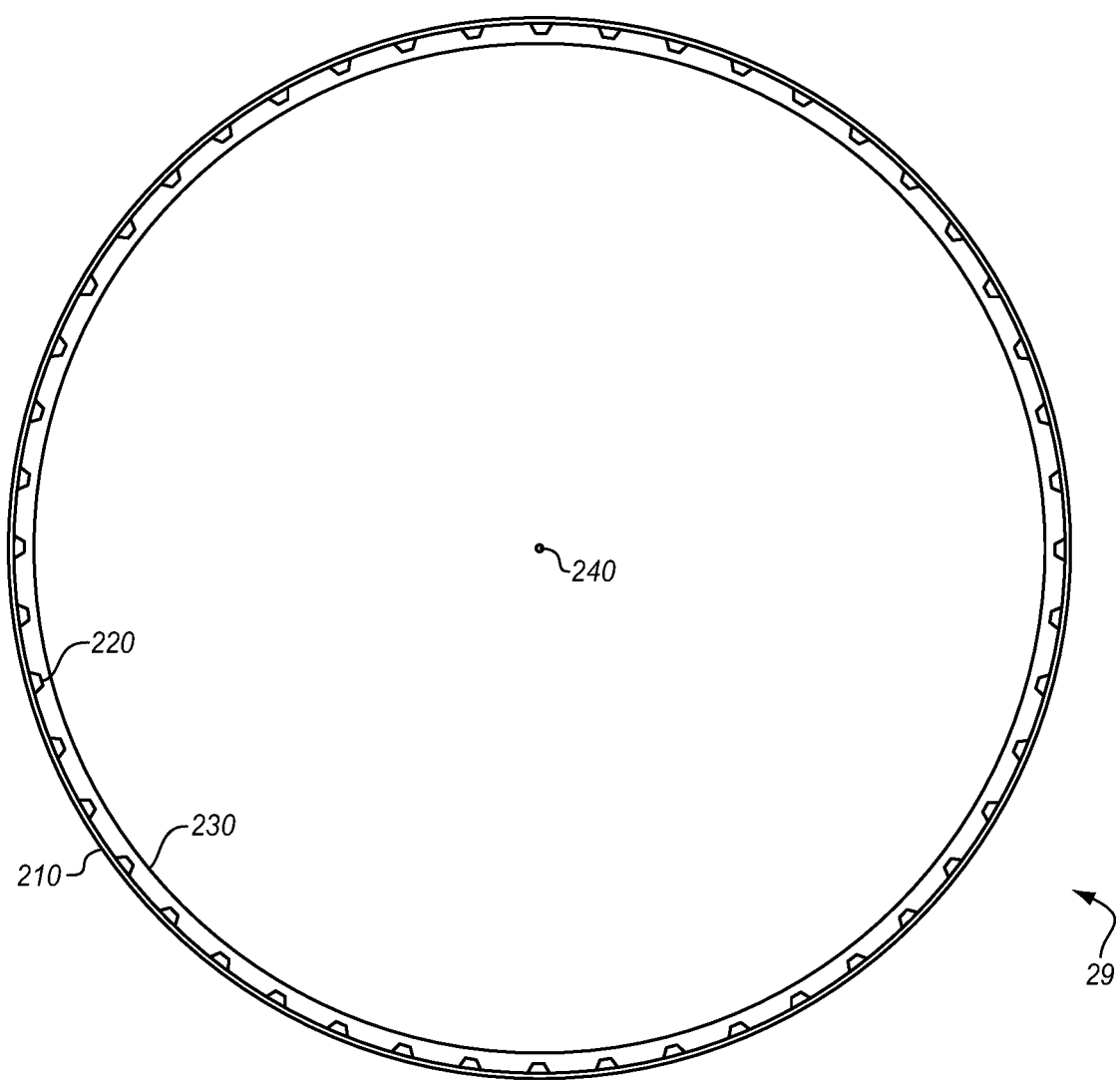
FIG. 2 illustrates a barrel section of an aircraft in an illustrative embodiment.

FIG. 2 illustrates a barrel section 29 in an illustrative embodiment, and corresponds with view arrows 2 of FIG. 1. Barrel section 29 includes a skin 210, which is structurally reinforced by the presence of frames 230 and stringers 220. The frames 230 extend circumferentially about the barrel section 29, and the stringers 220 extend perpendicular to the page at the barrel section 29. In this embodiment, the stringers 220 are arranged radially around a center 240 of the barrel section 29. During fabrication and/or assembly processes, the barrel section 29 may be subdivided into smaller sections that each comprise skin 210 accompanied by stringers 220, and frames 230 may be installed onto these sections. In one embodiment, the smaller sections have lengths of tens of feet (e.g., twenty feet to forty feet), and occupy a radial fraction of the barrel section 29 (e.g., resulting in a section that is arcuate, such as a half-barrel, quarter barrel, etc.).

Figure 3A:
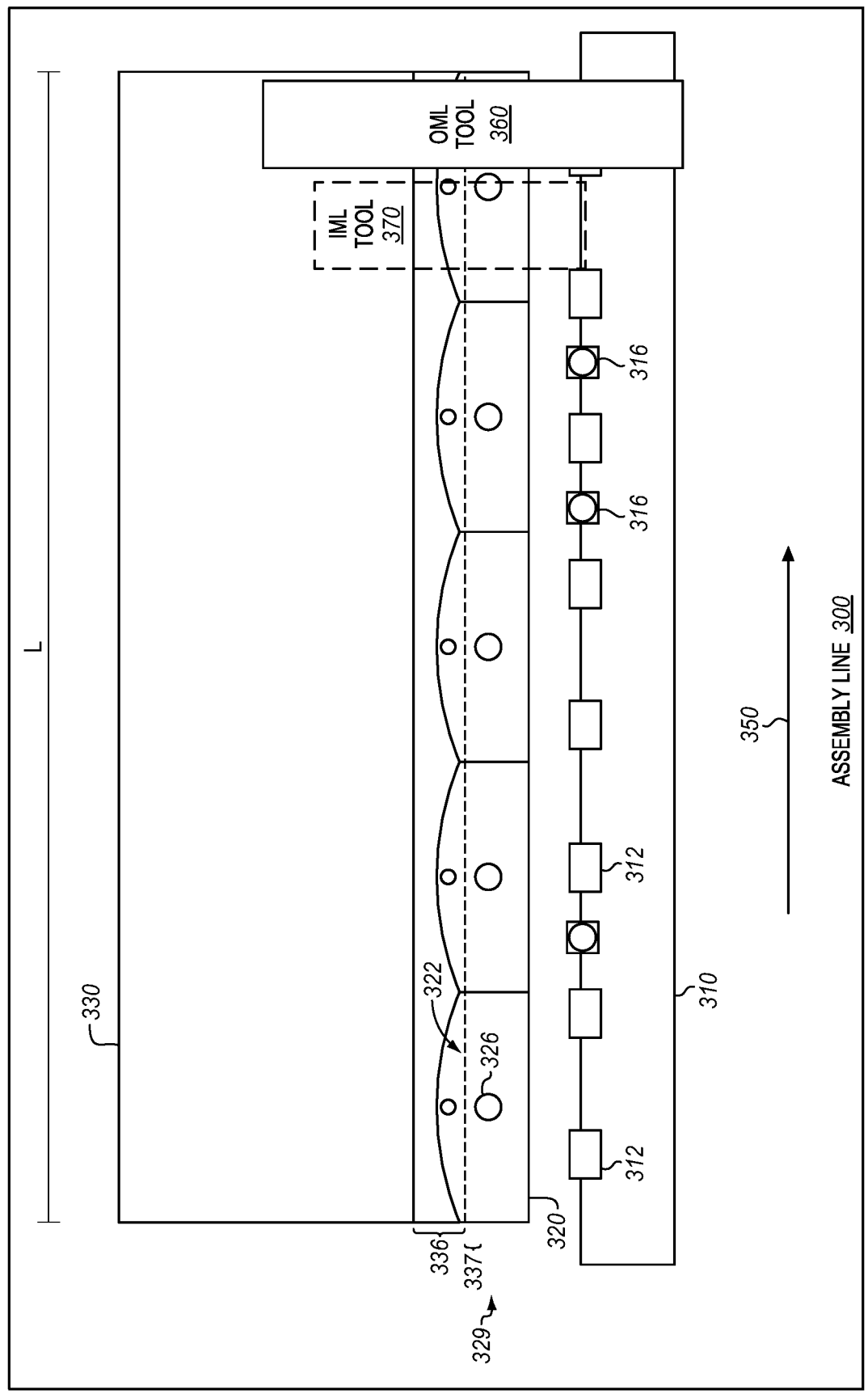
FIG. 3A is a schematic diagram of a side view of an assembly line that fractionally pulses a fuselage section in an illustrative embodiment.

FIG. 3A is a schematic diagram of a side view of an assembly line 300 that fractionally pulses a fuselage section 330 in an illustrative embodiment. The representative fuselage section 330 is shown as having a length L. Assembly line 300 comprises any system, device, or component operable to iteratively advance the fuselage sections 330 of fuselage 28 by less than their length L along a track 310, pause advancement of the fuselage sections 330 of fuselage 28, and then perform work on the fuselage sections 330 of fuselage 28 via tools (e.g., IML, tool 370, OML tool 360). In further embodiments, the advancing may be performed incrementally or continuously.

In this embodiment, a series 329 of plates 320 are attached sequentially along a length L of the fuselage section 330 to a lower portion 336 of the fuselage section 330. In one embodiment, the plates 320 are oriented lengthwise and arranged along the length (L) of the track 310 such that each of the plates 320 abuts another plate 320 when the plates 320 are attached to the fuselage section 330. The series 329 of plates 320 comprise components that engage with (e.g., form a sliding or rolling engagement with) the track 310. In one embodiment, the lower portion 336 comprises a manufacturing excess of the fuselage section 330. The manufacturing excess may be machined off of the fuselage section 330 prior to assembly of the fuselage section 330 with other sections. Each plate 320 also includes an indexing element 326 (e.g. a receptacle) that is dimensioned to engage with (e.g., receive) an indexing element 316 (e.g., a shot pin) at the track 310. Indexing may be performed during pauses between advancement of the fuselage section 330. In further embodiments, indexing may be performed at any location where an indexing element 326 and/or indexing element 316 are located.

Figure 4:
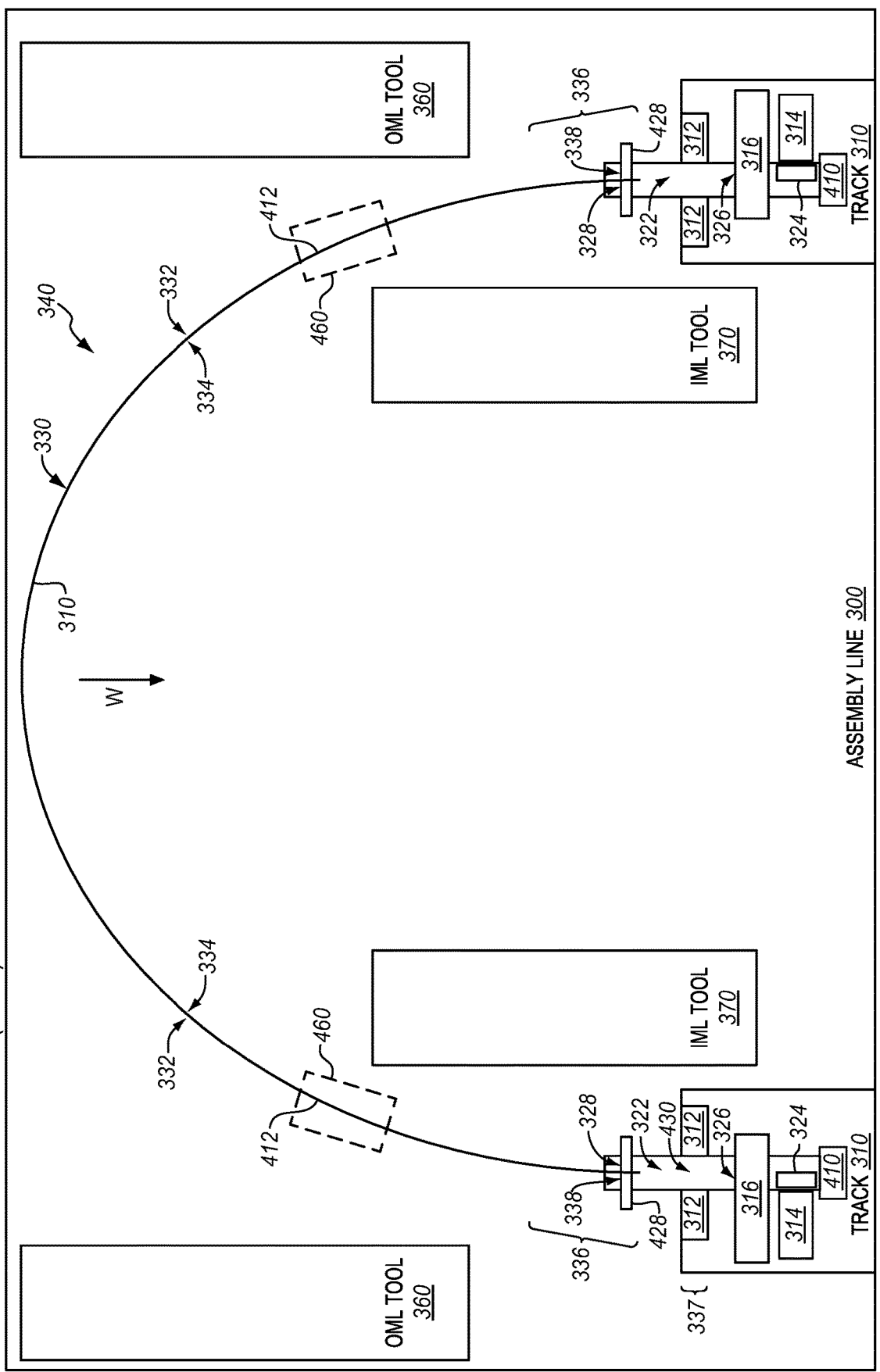
FIG. 4 is a schematic diagram of a front view of an assembly line that fractionally pulses a fuselage section in an illustrative embodiment.

The fuselage section 330 is mounted to a track 310 via the series 329 of plates 320. In this embodiment, the track 310 includes one or more drive units 312 (e.g., driver rollers, gear drives, etc.) that engage with (e.g., form a frictional fit with) the contact regions 337 of the plates 320. In further embodiments, the plates 320 rest upon additional rollers (such as support rollers 410, as shown in FIG. 4). The drive units 312 facilitate alignment of the fuselage section 330, and/or drive the fuselage section 330 along the track 310 in the process direction 350, such as by forming a frictional fit with the plates 320 and rolling along contact regions 337 of the plates 320. The fuselage section 330 is fractionally pulsed in a process direction 350 along the track 310. As used herein, a fuselage section 330 is "fractionally pulsed" when it is driven along the track 310 by a predefined distance that is less than its length L. For example, in one embodiment the predefined distance corresponds with a distance between frame install locations (a "frame pitch distance"), such as twenty-seven inches. After each fractional pulse, the fuselage section 330 may be locked into place relative to the track 310 in order to receive work in what is referred to as a pause. Depending on the embodiment, the fuselage section 330 may be locked into place via indexing elements 316 at the track 310 that are mated or engaged with (e.g., driven into) indexing elements 326 at the fuselage section 330, or by other means. When the indexing elements 316 at the track 310 are driven into the plates 320, the fuselage section 330 is held in a fixed position relative to the track 310. This enables the fuselage section 330 to undergo work from a work station 380 during pauses between fractional pulses. Furthermore, because the track 310 may extend for a substantial distance, multiple fuselage sections 330 may be disposed at the track 310. This means that multiple fuselage sections 330 may be synchronously pulsed and paused during the same time periods.

Each pause between fractional pulses may last for a predefined period of time (e.g. fifteen minutes, thirty minutes, etc.). In one embodiment, during each of these pauses, tools at the assembly line 300 may synchronously perform work at one or more fuselage sections 330 along the track 310 via one or more IML tools. In this embodiment, each work station 380 comprises an Inner Mold Line (IML) tool 370, and an Outer Mold Line (OML) tool 360. Depending on embodiment and/or placement along the track 310, work performed by the IML tool 370 and OML tool 360 may comprise cut-out operations that remove material from the fuselage section 330, installation processes that affix new components such as frames or door surrounds to the fuselage section 330, etc.

FIG. 3B is a further schematic diagram of a side view of an assembly line 300 that fractionally pulses a fuselage section 330 in an illustrative embodiment. FIG. 3B depicts further components of an assembly line 300 in one embodiment. In this embodiment, the fuselage section 330 comprises a half-barrel 340. FIG. 3B also illustrates an illustrative predefined distance D, as well as the ability of the IML tool 370 to interact with an IML 334 of fuselage section 330, and of the OML tool 360 to interact with an OML 332 of the fuselage section 330.

In the embodiment of FIG. 3B, each of the plates 320 includes an affixation feature 328 (e.g., a hole), which aligns with an affixation feature 338 (e.g., another hole) at the fuselage section 330 in order to facilitate attachment of the plate 320 to the fuselage section 330. In this embodiment, when the plates 320 are affixed to the fuselage section 330, each plate 320 abuts another plate 320 that is affixed to the fuselage section 330.

Each plate 320 includes a body 322 that may be dimensioned to form a frictional fit with drive units 312 disposed at a track 310. The body 322 is made from any suitable rigid material such as metal, CFRP, ceramic, etc. Furthermore, each plate 320 includes features 324 that are tracked by a scanner 314 to determine distances along each plate 320. In this regard, the features 324 indicate distances along each plate 320. The features 324 may comprise markings, physical indentations or embosses, visible coloration changes, or other distinguishing features. The scanners 314 may comprise laser distancing devices that detect embosses and/or indents, cameras that detect changes in color or absorption, other optical sensors, etc.

The OML tool 360 and IML tool 370 are arranged together to form a work station 380. At each work station 380, an OML tool 360 is disposed along the OML 332 of the fuselage section 330, in alignment with a corresponding IML tool 370. This alignment enables the tools of the work station 380 to operate collaboratively. In one embodiment, to facilitate indexing of the IML tool 370 and the OML tool 360 to the fuselage section 330, these tools are mounted at known positions relative to the track 310, and/or are fixed relative to the track 310. Thus, when indexing elements 316 hold the fuselage section 330 in position relative to the track 310, the OML tool 360 and IML tool 370 are disposed at known positions relative to the fuselage section 330.

The known arrangement of the tools relative to the track 310, and hence each other, means that there is no need to align the OML tool 360 with the IML tool 370 after each fractional pulse of the fuselage section 330. In further embodiments, the operations of the IML tool 370, OML tool 360, and/or the entirety of the work station 380, are directed by a controller 390 based on instructions stored in a Numerical Control (NC) program 392. In one embodiment, controller 390 is implemented as custom circuitry, as a hardware processor executing programmed instructions stored in memory, or some combination thereof.

The assembly line 300 provides a technical benefit over prior systems and techniques, because it enables work to be repeatedly performed with great accuracy, and without the need to move tools into alignment with each other and/or a fuselage section 330 after each operation is performed. Instead, the known relationship of the tools to the track 310 ensures that when the fuselage section 330 is locked into position relative to the track 310, the fuselage section 330 is ready to receive work.

FIG. 4 is a schematic diagram of a front view of an assembly line that fractionally pulses a fuselage section in an illustrative embodiment. From this angle, the fuselage section 330 is more clearly illustrated as a half-barrel 340. The plates 320 are affixed to the fuselage section 330 via fasteners 428. Furthermore, FIG. 4 shows that IML tools 370 and OML tools 360 may operate on either or both the left side and right side of the fuselage section 330, for example, to perform work upon a portion 412 of the fuselage section 330, within a region 460.

FIG. 4 also depicts the geometry of the track 310 in further detail. Specifically, the drive units 312 form a frictional fit with the bodies 322 of the plates 320 to form a nip 430, and a support roller 410 bears a weight (W) of the fuselage section 330 that is not borne by the nip 430.

Figure 5:
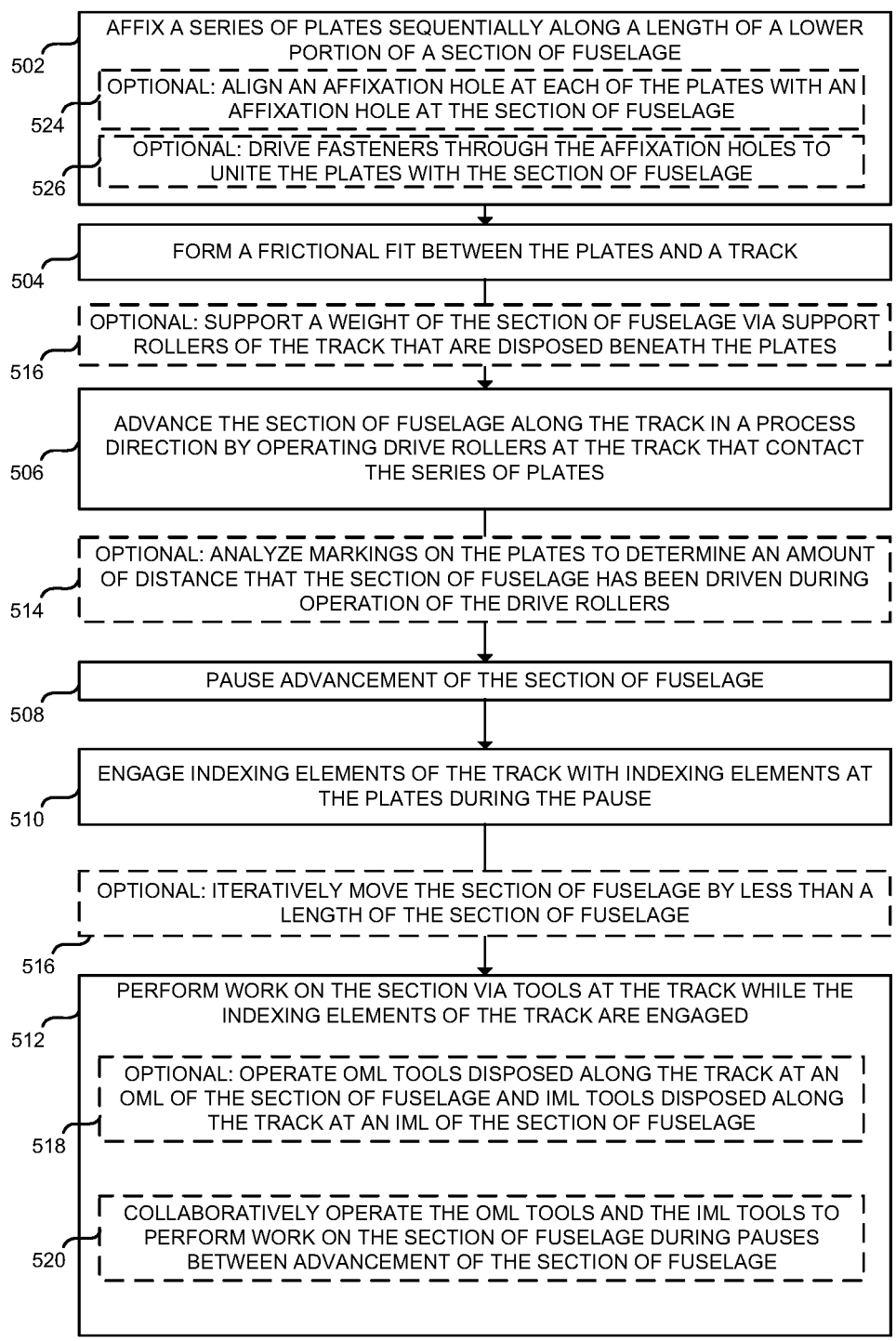
FIG. 5 is a flowchart illustrating a method for operating an assembly line that fractionally pulses a fuselage section in an illustrative embodiment.

Illustrative details of the operation of assembly line 300 will be discussed with regard to FIG. 5, a flowchart that illustrates a method 500 for operating an assembly line that fractionally pulses a fuselage section 330.

The steps of method 500 are described with reference to assembly line 300 of FIG. 3, but those skilled in the art will appreciate that method 500 may be performed in other systems. The steps of the flowcharts described herein are not all inclusive and may include other steps not shown. The steps described herein may also be performed in an alternative order. Assume, for the following discussion of the method, that a fuselage section 330 of a fuselage 28 has been fabricated (i.e., has just been removed from a cure tool), and awaits processing to install frames 230, to have door and window cut-outs machined out of it, and to receive door and window surrounds in the door and window cut-outs.

Method 500 includes affixing, at 502, a series 329 of plates 320 sequentially along a length L of a lower portion 336 of a fuselage section 330. Optionally, the method 500 further includes, at 524, aligning an affixation feature 328 at each of the plates 320 with a corresponding affixation feature 338 at the fuselage section 330. In this embodiment, each of the plates 320 is designed for fastening to a separate affixation feature 338 at the fuselage section 330. Optionally, the method 500 further includes, at 526, driving fasteners 428 through the affixation features 328 and affixation features 338 to unite the plates 320 with the fuselage section 330.

After the plates 320 have been installed onto the fuselage section 330, the fuselage section 330 is placed onto track 310, such that plates 320 are placed between the drive units 312 of the track, method 500 further includes forming, at 504, a frictional fit between the plates 320 and the track 310. Optionally the weight W of the fuselage section 330 is supported via support rollers 410 of the track 310 that are disposed beneath the plates 320, at 516.

With the fuselage section 330 mounted to the track, method 500 further comprises advancing, at 506, the fuselage section 330 along the track 310 in a process direction by operating the drive units 312 at the track 310 that contact the series 329 of plates 320. In one embodiment, this comprises spinning the drive units 312 while the frictional fit is maintained, such that the action of the drive units 312 applies a force that drives the fuselage section 330 forward in the process direction 350.

Optionally, method 500 further includes analyzing, at 514, features 324 on the plates 320 to determine an amount of distance that the fuselage section 330 has been driven during operation of the drive units 312. For example, depending on a pattern defined by the markings, a scanner 314 may count a number of marks that have passed by the scanner 314 in order to determine the amount of distance, or may detect the presence of specific patterns (e.g., specific marks, or arrangements thereof) that indicate specific amounts of distance along a plate 320. Based on this information, a controller 390 may determine whether the amount of distance currently traveled by the fuselage section 330 equals the distance D for each fractional pulse. In one embodiment, each time the distance D is traveled, indexing elements 326 at the plates 320 align with indexing elements 316 at the track 310.

Upon driving the fuselage section 330 by the distance D, the method 500 further includes pausing, at 508, advancement of the fuselage section 330. In one embodiment, this comprises halting operation of the drive units 312, or braking the drive units 312.

Method 500 further comprises engaging, at 510, indexing elements 316 of the track 310 with indexing elements 326 at the plates 320 during the pause. In one embodiment, this comprises driving shot pins into corresponding receptacles. With the indexing elements 316 engaged to the indexing elements 326, the fuselage section 330 is fixed relative to the track 310. This means that the location of the fuselage section 330 is known relative to work stations 380 that also occupy known locations relative to the track 310.

Optionally, method 500 additionally includes iteratively moving, at 522, the fuselage section 330 by less than a length L of the fuselage section 330, such as less than one fifth of the length L or any other fraction thereof, a distance corresponding to a frame pitch, between twenty-four and thirty inches, etc. In one embodiment, each time the fuselage section 330 is moved, it is fractionally pulsed by the same distance. This may help to ensure that frames 230, window cut-outs, windows, etc. are separated by uniform distances in accordance with a design for the fuselage section. The iterative movement and pausing is performed synchronously across all fuselage sections 330 mounted to the track 310 in one embodiment, which enables breaks for workers at the work stations 380 to be synchronized, and further allows for ingress and egress of materials and personnel at the track 310 to be synchronized.

While the fuselage section 330 is paused, the work stations 380 may reliably operate upon the fuselage section 330 within desired tolerance ranges. Hence, method 500 further includes performing, at 512, work on the fuselage section 330 via tools (e.g., IML, tool 370, OML tool 360) at the track 310 while the indexing elements 316 of the track are engaged with the indexing elements 326 of the plates 320. Performing work may comprise machining, drilling, or cutting out portions of the fuselage section 330. Performing work may also comprise installing parts such as door or window surrounds into the fuselage section 330.

Optionally, method 500 also includes operating, at 518, the OML tools 360 disposed along the track 310 at an OML 332 of the fuselage section 330 and IML tools 370 disposed along the track 310 at an IML 334 of the fuselage section 330. Optionally, method 500 also includes collaboratively operating, at 520, the OML tools 360 and the IML tools 370 to perform work on the fuselage section 330 during pauses between advancement of the fuselage section 330.

Method 500 provides a substantial benefit over prior techniques, because they reduce amounts of space required for fabrication and assembly at a factory floor, increase throughput, and reduce downtime. Furthermore, these techniques increase reliability and reduce or eliminate time spent aligning IML tools 370 with OML tools 360.

With a discussion of assembly line 300 and its modes of operation discussed above, the following description illustrates and describes one or more specific implementations of assembly line 300, and/or components thereof.

Figure 6:
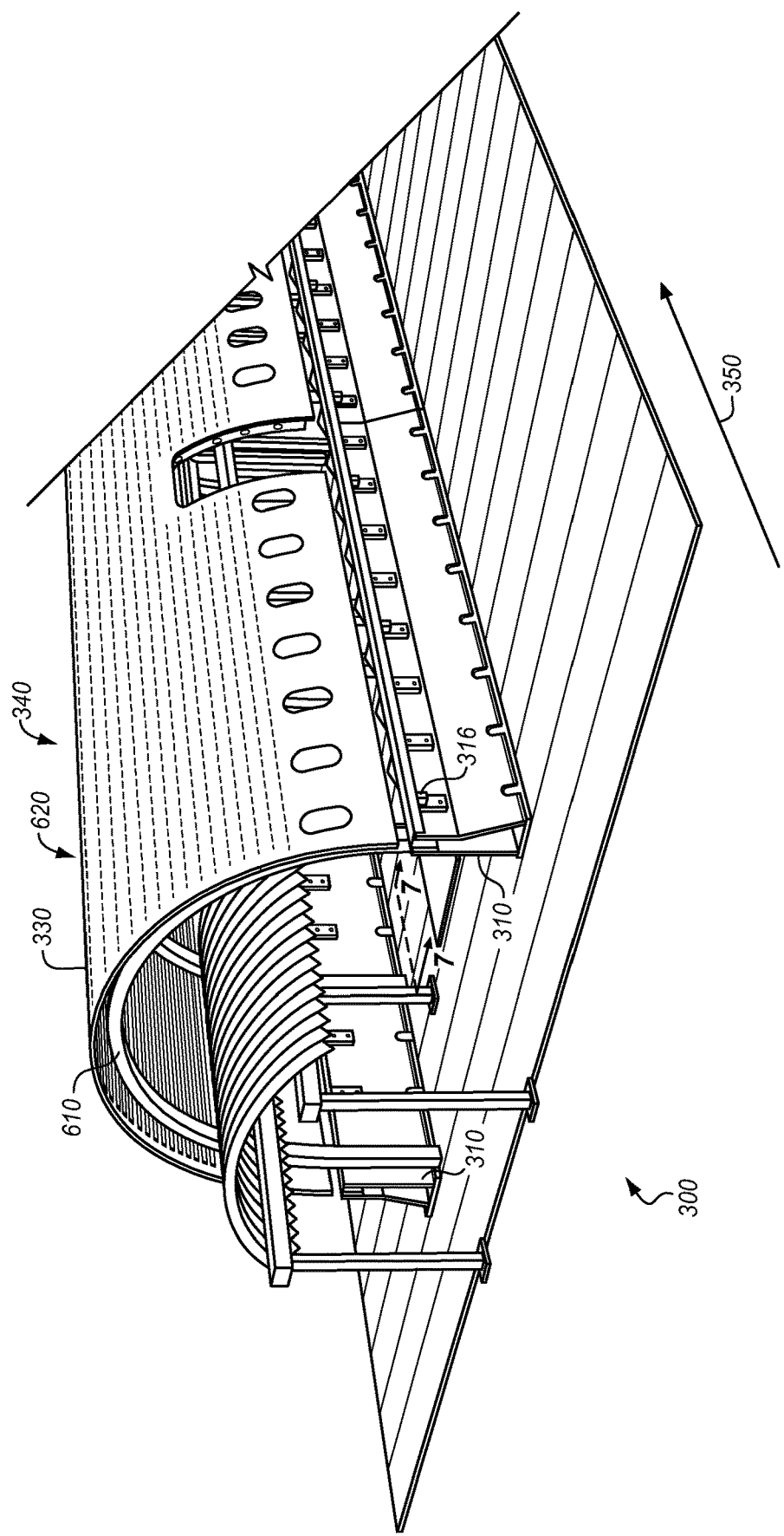
FIG. 6 is a perspective view of an assembly line that fractionally pulses a fuselage section in an illustrative embodiment.

FIG. 6 is a perspective view of an assembly line 300 that fractionally pulses a fuselage section 330 in an illustrative embodiment. From this perspective view, the fuselage section 330 is more easily visible as a half-barrel 340, and tracks 310 on either side of the fuselage section 330 are more clearly illustrated. Supports 610 are coupled with the tracks 310, and help to enforce a desired contour 620 on the fuselage section 330.

Figure 7:
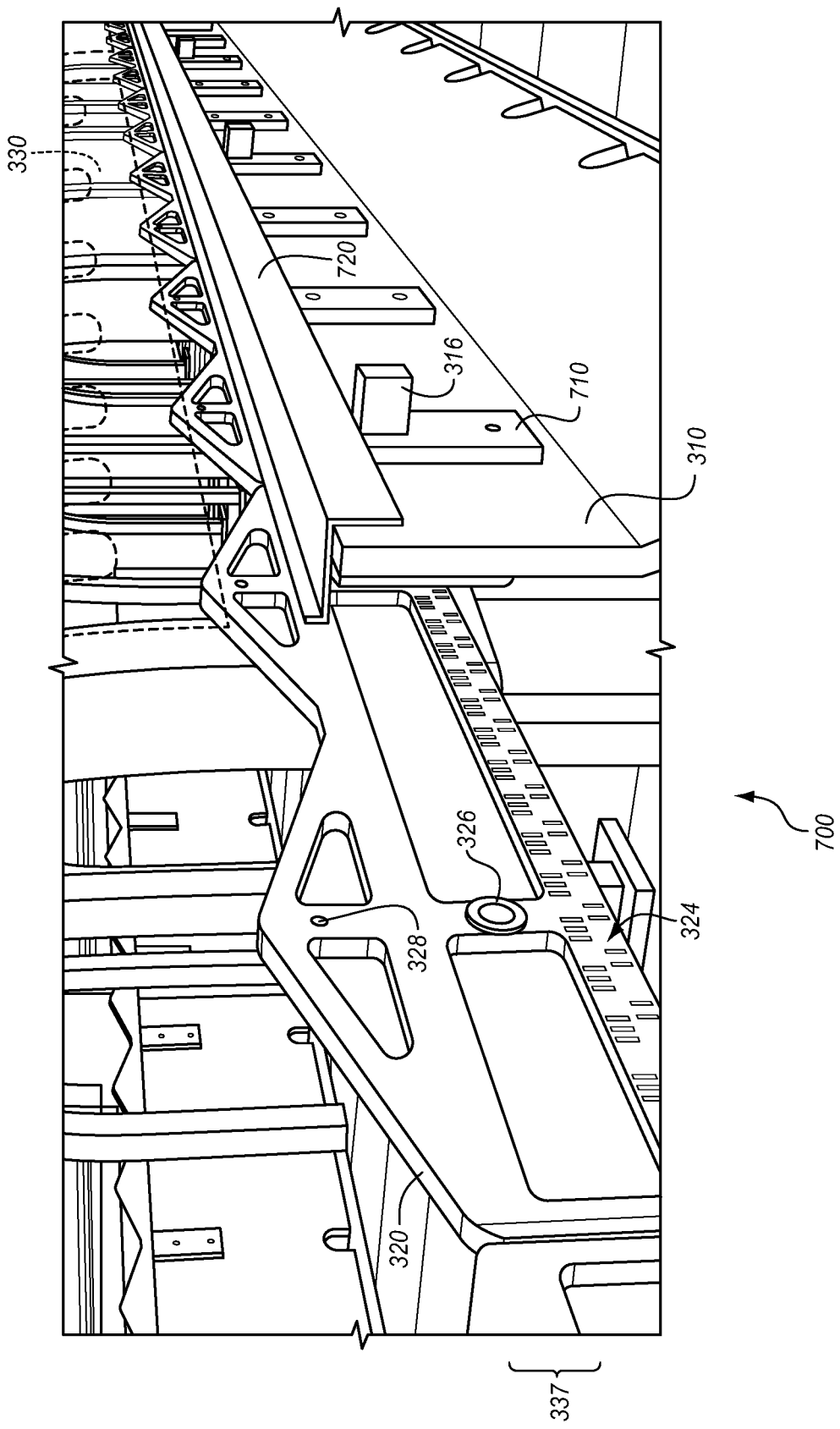
FIG. 7 is a detail perspective view of a portion of the assembly line of FIG. 6 in an illustrative embodiment.

FIG. 7 is a detail perspective view of a portion of the assembly line 300 of FIG. 6 in an illustrative embodiment, and corresponds with view arrows 7 of FIG. 6. Specifically, FIG. 7 depicts an entrance 700 to the track 310, wherein plates 320 are inserted into the track 310. Insertion of the plates 320 may be performed while a weight W of the fuselage section 330 is supported by a mobile crane or gantry as desired.

In the view of FIG. 7, plates 320 are visible, as are the indexing elements 326, affixation features 328, and features 324 at the plates 320. In this embodiment, the track 310 additionally includes an upper alignment rail 720, which helps to retain the plates 320 in position. The track 310 further includes indexing stations 710, which retain indexing elements 316 in fixed positions relative to the track 310.

Figure 8:
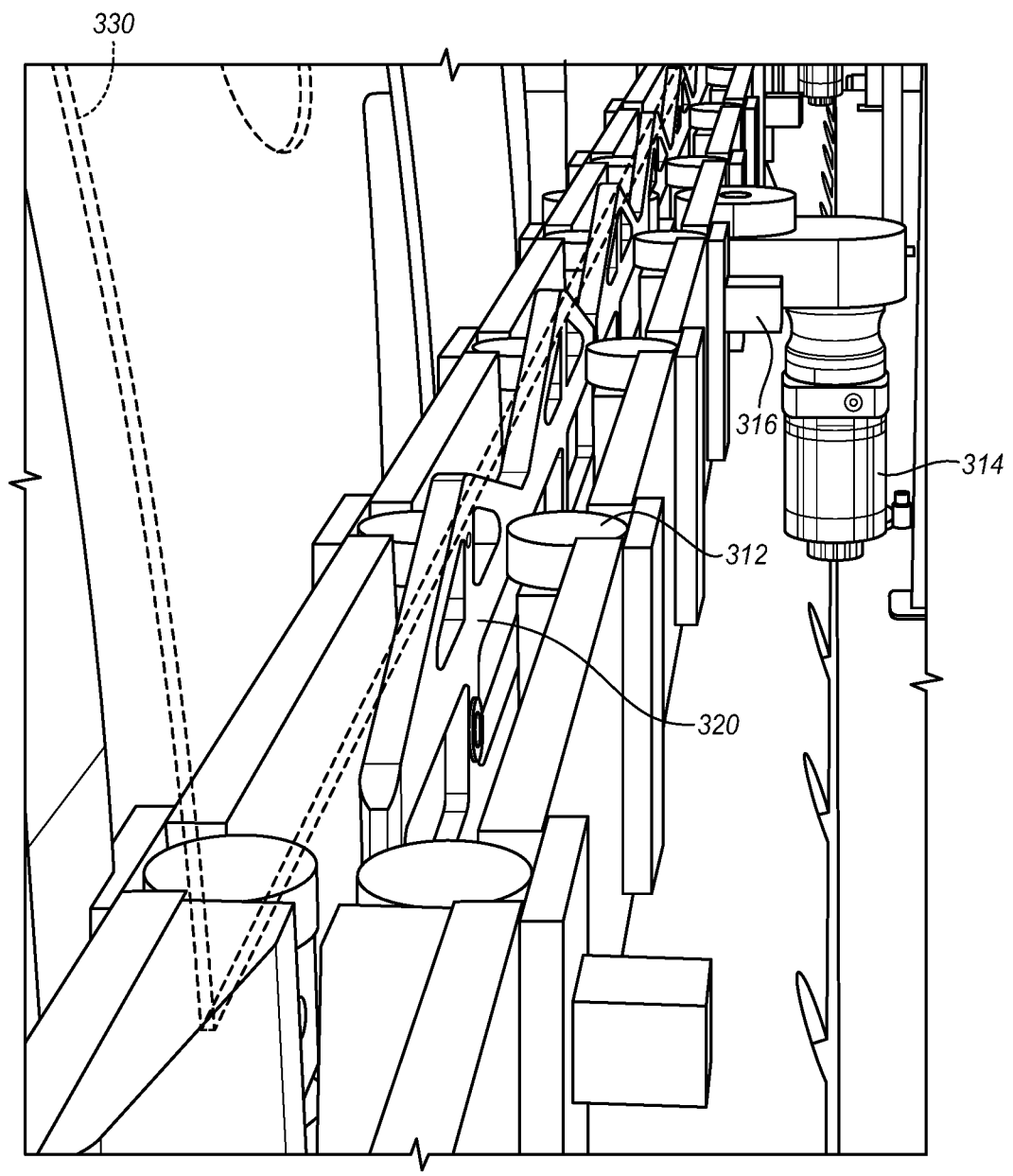
FIG. 8 is another detail perspective view of another portion of the assembly line of FIG. 6 in an illustrative embodiment.

FIG. 8 is another detail perspective view, of another portion of the assembly line of FIG. 6, in an illustrative embodiment. FIG. 8 depicts components that operate along a track 310 in order to operate on a fuselage section 330. Drive units 312 press against plates 320 to form a friction fit, while scanners 314 analyze features 324 that pass by the scanners 314, in order to determine a distance traveled by the fuselage section 330 during a fractional pulse. Indexing elements 316 (e.g., shot pins) engage with indexing elements 326 (e.g., receptacles) to fix the fuselage section 330 in position.

Figure 9:
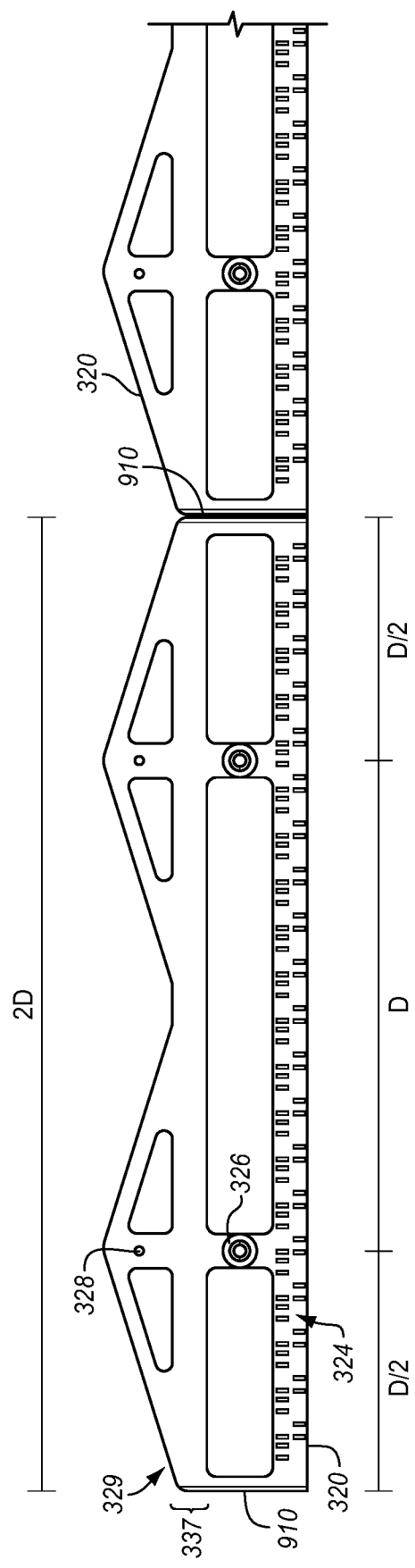
FIG. 9 is a side view of plates for affixation to a fuselage section in an illustrative embodiment.

FIG. 9 is a side view of a series 329 of plates 320 for affixation to a fuselage section 330 in an illustrative embodiment. In this embodiment, the plates 320 each extend for a distance 2D, which is twice the distance D which the fuselage section 330 is pulsed. Indexing elements 326 within the plate 320 are separated by the distance D, and are separated from ends 910 of each plate 320 by a distance D/2, which is half the distance D. In this manner, when two plates 320 are placed against each other, indexing elements 326 along the entirety of the series 329 of plates are separated from each other by a distance D. This provides a technical benefit by ensuring that indexing of the fuselage section 330 to a track 310 may be precisely and accurately performed, even after the fuselage section 330 has been pulsed multiple times in a process direction.

EXAMPLES

In the following examples, additional processes, systems, and methods are described in the context of an assembly line that fractionally pulses fuselage sections in an illustrative embodiment.

Figure 10:
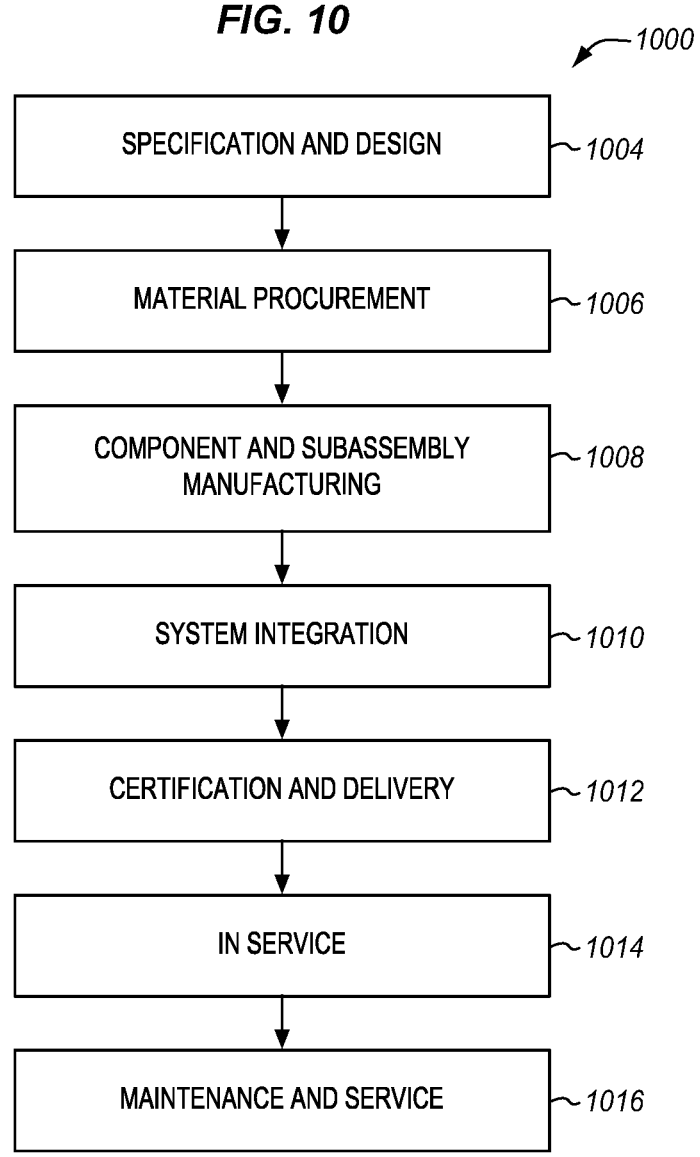
FIG. 10 is a flow diagram of aircraft production and service methodology in an illustrative embodiment.
Figure 11:
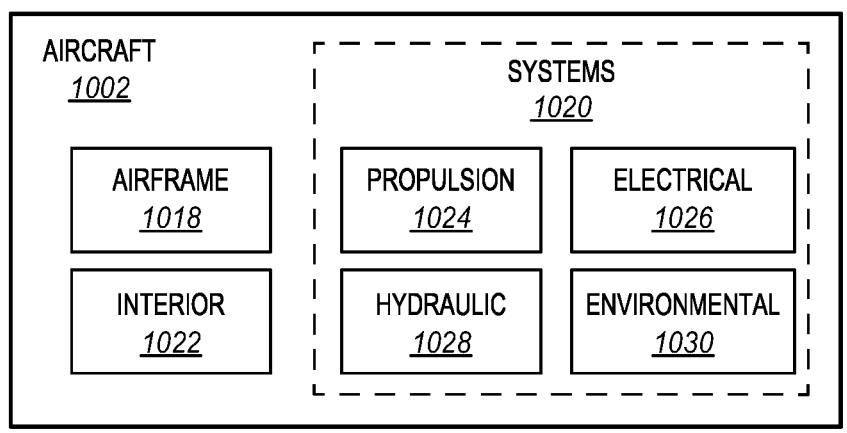
FIG. 11 is a block diagram of an aircraft in an illustrative embodiment.

Referring more particularly to the drawings, embodiments of the disclosure may be described in the context of aircraft manufacturing and service in method 1000 as shown in FIG. 10 and an aircraft 1002 as shown in FIG. 11. During pre-production, method 1000 may include specification and design 1004 of the aircraft 1002 and material procurement 1006. During production, component and subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine work in maintenance and service 1016 (which may also include modification, reconfiguration, refurbishment, and so on). Apparatus and methods embodied herein may be employed during any one or more suitable stages of the production and service described in method 1000 (e.g., specification and design 1004, material procurement 1006, component and subassembly manufacturing 1008, system integration 1010, certification and delivery 1012, service 1014, maintenance and service 1016) and/or any suitable component of aircraft 1002 (e.g., airframe 1018, systems 1020, interior 1022, propulsion system 1024, electrical system 1026, hydraulic system 1028, environmental system 1030).

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 1002 produced by method 1000 may include an airframe 1018 with a plurality of systems 1020 and an interior 1022. Examples of systems 1020 include one or more of a propulsion system 1024, an electrical system 1026, a hydraulic system 1028, and an environmental system 1030. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1000. For example, components or subassemblies corresponding to component and subassembly manufacturing 1008 may be fabricated or manufactured in a manner similar to components or subassemblies produced while the aircraft 1002 is in service. Also, one or more apparatus embodiments, method embodiments, or a combination thereof may be utilized during the subassembly manufacturing 1008 and system integration 1010, for example, by substantially expediting assembly of or reducing the cost of an aircraft 1002. Similarly, one or more of apparatus embodiments, method embodiments, or a combination thereof may be utilized while the aircraft 1002 is in service, for example and without limitation during the maintenance and service 1016. Thus, the invention may be used in any stages discussed herein, or any combination thereof, such as specification and design 1004, material procurement 1006, component and subassembly manufacturing 1008, system integration 1010, certification and delivery 1012, service 1014, maintenance and service 1016 and/or any suitable component of aircraft 1002 (e.g., airframe 1018, systems 1020, interior 1022, propulsion system 1024, electrical system 1026, hydraulic system 1028, and/or environmental system 1030).

In one embodiment, a part comprises a portion of airframe 1018, and is manufactured during component and subassembly manufacturing 1008. The part may then be assembled into an aircraft in system integration 1010, and then be utilized in service 1014 until wear renders the part unusable. Then, in maintenance and service 1016, the part may be discarded and replaced with a newly manufactured part. Inventive components and methods may be utilized throughout component and subassembly manufacturing 1008 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof

What is claimed is:

1. A system for advancing a fuselage section of an aircraft, the system comprising:
 a series of plates configured to be sequentially affixed along a length of the fuselage section;
 a track configured to form a frictional fit with the plates, the track comprising:
  drive units configured to form nips retaining the series of plates, and to advance the fuselage section along the track in a process direction; and
  indexing elements configured to engage with indexing elements at the plates during pauses between operation of the drive units; and
 tools configured to perform work on the fuselage section while the indexing elements of the track are engaged.

2. The system of claim 1 wherein:
 each plate of the plates includes features that indicate distances along the plate; and
 the track further comprises a scanner configured to analyze the features to determine an amount of distance that the fuselage section has been driven during operation of the drive units.

3. The system of claim 1 wherein:
 the track further comprises support rollers disposed beneath the plates and configured to bear a weight of the fuselage section.

4. The system of claim 1 wherein:
each of the plates defines an affixation feature configured to align with an affixation feature at the fuselage section, and the system further comprises:
fasteners configured to be driven through the affixation features to unite the plates with the fuselage section.

5. The system of claim 1 wherein:
the tools comprise:
Outer Mold Line (OML) tools disposed along the track at an OML of the fuselage section; and
Inner Mold Line (IML) tools disposed along the track at an IML of the fuselage section.

6. The system of claim 5 wherein:
the OML tools and the IML tools are configured to collaboratively perform work on the fuselage section during pauses between advancement of the fuselage section.

7. The system of claim 1 wherein:
the drive units are configured to iteratively advance the fuselage section along the track in the process direction by less than the length of the fuselage section with pauses between advancement of the fuselage section.

8. The system of claim 7 wherein:
the drive units are configured to iteratively advance the fuselage section along the track in the process direction by less than one fifth of the length of the fuselage section.

9. A method for transporting and performing work upon a fuselage section, the method comprising:
affixing a series of plates sequentially along a length of a lower portion of the fuselage section;
forming a frictional fit between the plates and a track;
advancing the fuselage section along the track in a process direction by operating drive units at the track that contact the series of plates;
pausing advancement of the fuselage section;
engaging indexing elements of the track with indexing elements at the plates during the pause; and
performing work on the fuselage section via tools at the track while the indexing elements of the track are engaged.

10. The method of claim 9 further comprising:
analyzing markings on the plates to determine an amount of distance that the fuselage section has been driven during operation of the drive units.

11. The method of claim 9 further comprising:
supporting a weight of the fuselage section via support rollers of the track that are disposed beneath the plates.

12. The method of claim 9 wherein:
affixing the series of plates comprises:
aligning an affixation feature at each of the plates with an affixation feature at the fuselage section; and
driving fasteners through the affixation features to unite the plates with the fuselage section.

13. The method of claim 9 wherein:
performing the work comprises:
operating Outer Mold Line (OML) tools disposed along the track at an OML of the fuselage section and Inner Mold Line (IML) tools disposed along the track at an IML, of the fuselage section.

14. The method of claim 13 wherein:
performing the work comprises collaboratively operating the OML tools and the IML tools to perform work on the fuselage section.

15. The method of claim 9 wherein:
advancing the fuselage section along the track in the process direction comprises moving the fuselage section by less than a length of the fuselage section.

16. The method of claim 15 wherein:
advancing the fuselage section along the track in the process direction moves the fuselage section by less than one fifth of the length of the fuselage section.

17. A system for performing work on a fuselage section, the system comprising:
a series of plates configured to be sequentially affixed along a length of the fuselage section;
a track; and
work stations disposed along the track;
wherein drive units at the track are configured to form a frictional fit with the plates, and to iteratively advance the fuselage section along the track in a process direction with pauses between advancement of the fuselage section;
wherein indexing elements at the track are configured to engage with indexing elements at the plates during the pauses;
wherein the work stations include tools configured to perform work on the fuselage section when the fuselage section is paused.

18. The system of claim 17 further comprising:
scanners configured to analyze markings at the fuselage section to determine a distance traveled by the fuselage section.

19. The system of claim 17 wherein:
the drive units are configured to advance the fuselage section by less than a length of the fuselage section before pausing.

20. The system of claim 19 wherein:
the drive units are configured to advance the fuselage section by less than one fifth of the length of the fuselage section before pausing.

* * * * *